(12) United States Patent
Klippert et al.

(10) Patent No.: US 10,742,095 B2
(45) Date of Patent: Aug. 11, 2020

(54) ELECTRONIC HOUSING, MOTOR PUMP HAVING THE ELECTRONIC HOUSING AND METHOD OF PRODUCING THE ELECTRONIC HOUSING

(71) Applicant: BROSE FAHRZEUGTEILE GMBH & CO. KOMMANDITGESELLSCHAFT, WUERZBURG, Wuerzburg (DE)

(72) Inventors: Uwe Klippert, Oberaula (DE); Christoph Otto, Ahorn (DE)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 0 days.

(21) Appl. No.: 15/876,794

(22) Filed: Jan. 22, 2018

(65) Prior Publication Data
US 2018/0145567 A1    May 24, 2018

Related U.S. Application Data

(63) Continuation of application No. PCT/EP2016/066788, filed on Jul. 14, 2016.

(30) Foreign Application Priority Data

Jul. 22, 2015  (DE) .................. 10 2015 213 865

(51) Int. Cl.
*H02K 11/33* (2016.01)
*H02K 5/22* (2006.01)
*H02K 5/10* (2006.01)
*H02K 7/14* (2006.01)

(52) U.S. Cl.
CPC ............. *H02K 11/33* (2016.01); *H02K 5/225* (2013.01); *H02K 5/10* (2013.01); *H02K 7/14* (2013.01)

(58) Field of Classification Search
CPC ........... H02K 11/33; H02K 5/225; H02K 5/10
USPC ........................................................... 310/89
See application file for complete search history.

(56) References Cited

U.S. PATENT DOCUMENTS

| 4,626,721 A | * | 12/1986 | Ouchi ................... F04D 29/126 174/151 |
| 5,737,188 A | | 4/1998 | Flierl et al. |
| 7,579,727 B2 | | 8/2009 | Becker et al. |

(Continued)

FOREIGN PATENT DOCUMENTS

| CA | 2895591 A1 | 7/2014 |
| CN | 1643246 A | 7/2005 |

(Continued)

OTHER PUBLICATIONS https://www.professionalplastics.com/professionalplastics/RubberandElastomersOverview.pdf, professional plastics inc.*

*Primary Examiner* — Terrance L Kenerly
(74) *Attorney, Agent, or Firm* — Laurence A. Greenberg; Werner H. Stemer; Ralph E. Locher

(57) ABSTRACT

An electronics housing, in particular for a pump electronics of an electric motor-powered auxiliary pump for a motor vehicle for conveying a fluid. The electronics housing has a housing shell and an electrical plug. The plug protrudes at least partially through the housing shell, and the plug is at least partially covered with a first material which swells upon contact with the fluid.

6 Claims, 2 Drawing Sheets

(56) References Cited

U.S. PATENT DOCUMENTS

| | | | |
|---|---|---|---|
| 8,567,451 B2 * | 10/2013 | Kiest, Jr. | F16L 55/179 |
| | | | 138/97 |
| 2005/0282023 A1 * | 12/2005 | Comeaux | B32B 25/20 |
| | | | 428/447 |
| 2013/0294298 A1 * | 11/2013 | Chang | H04L 27/2602 |
| | | | 370/280 |
| 2013/0343935 A1 | 12/2013 | Høj et al. | |
| 2014/0056741 A1 | 2/2014 | Stentoft | |

FOREIGN PATENT DOCUMENTS

| | | | |
|---|---|---|---|
| CN | 103443469 A | 12/2013 | |
| CN | 104704725 A | 6/2015 | |
| DE | 19515622 A1 | 11/1996 | |
| DE | 19844603 A1 | 4/1999 | |
| DE | 102005043416 A1 | 3/2007 | |
| DE | 102011006928 A1 | 10/2012 | |
| DE | 102011085054 A1 | 5/2013 | |
| DE | 102013220599 A1 | 4/2015 | |
| JP | 2003079092 A | 3/2003 | |
| JP | 2014229489 A | 12/2014 | |

* cited by examiner

ELECTRONIC HOUSING, MOTOR PUMP HAVING THE ELECTRONIC HOUSING AND METHOD OF PRODUCING THE ELECTRONIC HOUSING

CROSS-REFERENCE TO RELATED APPLICATION

This application is a continuation, under 35 U.S.C. § 120, of copending international application No. PCT/EP2016/066788, filed Jul. 14, 2016, which designated the United States; this application also claims the priority, under 35 U.S.C. § 119, of German patent application No. DE 10 2015 213 865.8, filed Jul. 22, 2015; the prior applications are herewith incorporated by reference in their entirety.

BACKGROUND OF THE INVENTION

Field of the Invention

The invention lies in the field of pumps, preferably in the field of pumps operated or driven electrically or by electric motor, and relates to an electronics housing for pump electronics. It further relates to a pump having such electronics housing, and to a method of producing or assembling the electronics housing. A pump is understood here especially to mean an auxiliary or main pump in a or for a motor vehicle.

An electric oil pump and especially also what is called an auxiliary or additional pump serves to convey oil for a control task or for cooling, especially for moving parts or components, for example in (motor) vehicles including those driven by internal combustion engine, by hybrid technology or electrically. An oil pump of this kind, owing to its conveying properties, typically generates an oil circuit, with a pressure and volume flow rate. An auxiliary or additional pump driven electrically or by electric motor, for example, frequently serves for at least temporary lubrication or additional lubrication of transmission components of a motor vehicle transmission, especially an automatic transmission. The oil conveyed also serves to cool the components or additional components of the drive train of a motor vehicle of this kind.

For control and regulation, an oil pump of this kind conventionally contains pump electronics. The pump electronics include an electronic circuit, sensors and/or an electronic connection to a cable harness of the motor vehicle, and often electrical interfaces for actuation of actuators. The pump electronics are suitably installed within an essentially closed housing shell of an electronics housing. The electrical connections and interfaces are typically implemented by one or more plug connectors that at least partly project through the electronics housing, and hence provide an electrically conductive connection or attachment option between pump electronics within the housing shell and, for example, motor lines of the electric motor. In a typical installation, the electronics housing—and hence the pump electronics—are arranged together with the oil pump in the oil sump of the motor vehicle transmission. In this case, the electronics housing lies completely or at least partly directly in the oil.

An example of a known method of protecting the sensitive pump electronics is that of using hermetically sealed steel housings as electronics housing, from which glass-encased pins project as plug connectors for electrical coupling of the pump electronics. Preference is given, however, to using housings known from published, non-prosecuted German patent applications DE 195 15 622 A1 (corresponding to U.S. Pat. No. 5,737,188) or DE 10 2013 220 599 A1, which are often manufactured in a two-component injection molding process. In this case, a lead frame as preliminary injection molding or insert is over molded with an electrically nonconductive thermoplastic. The plug connector formed in this way is subsequently over molded with a plastic for the housing shell in a second injection molding process. Typically, a similar plastic is used in both injection molding processes, preferably a polyamide, polybutylene terephthalate or polyphenylene sulfide material. This provides a mechanically stable and electrically safe electronics housing in which the pump electronics can be encapsulated in an operationally reliable manner.

Electronics housings of this kind should be designed, or configured in terms of their construction, for relatively wide temperature ranges. The temperature range to be mastered or considered in the oil sump is typically between, for example, −40° C. and +130° C. It should also be taken into account here that the lubricant (oil) used has a viscosity which is temperature-dependent and decreases with increasing temperature, meaning that it is greater at lower temperatures than at higher temperatures. Moreover, the lubricant or oil used may include aggressive additives which can attack and damage the electronics.

Especially when operating temperatures are relatively high or when temperatures rise for operational reasons, there is therefore also an increase in the risk of leaks. The reason for this is that, on the one hand, the avoidance of leaks requires a correspondingly impervious electronics housing, while, on the other hand, owing to the high variations in temperature, housing expansions, meaning different expansions of the electronics housing and/or the plug connectors with increasing temperatures and hence falling viscosity of the oil or lubricant used, have an increasing tendency to cause leaks, which are comparatively less marked at low temperatures and hence high viscosity of the oil/lubricant. Disadvantageously, changes in pressure of the air enclosed in the electronics housing enhance such tendencies to cause leaks, and so high mechanical demands are made on the fluid-tightness of the electronics housing.

Especially in the region of the over molded lead frame, it is frequently the case that capillary gaps occur between the plastic of the over molding and the lead frame, through which the oil can penetrate into the electronics housing. These gaps have to date been sealed in a complex manner by additional sealing materials outside the electronics housing around the plug connectors. For example, published, non-prosecuted German patent application DE 10 2011 085 054 A1 discloses that, in the case of a lead frame over molded with a thermoplastic, a thermoset or a liquid silicone adhesive is introduced for sealing between the plastic and the lead frame. The additional sealing entails an additional manufacturing step in the production and is thus associated with additional costs.

SUMMARY OF THE INVENTION

It is an object of the invention to specify an electronics housing which, in an inexpensive manner and with a simple construction, provides a particularly fluid-tight housing for pump electronics of an auxiliary pump in the form of an electric motor in a motor vehicle. In addition, an electric motor pump with such an electronics housing and a method of producing such an electronics housing are to be specified.

For this purpose, the electronics housing contains an essentially closed housing shell for accommodation and encapsulation preferably of pump electronics. The pump electronics have appropriately been coupled, or can be coupled, for signaling and power purposes to an (auxiliary) pump in the form of an electric motor for conveying of a fluid. For this purpose, the housing shell has an electrical plug connector that at least partly projects through the housing shell, the plug connector being at least partly ensheathed by a first material that swells on contact with the fluid. The swelling of the material provides essentially automatic sealing of the housing shell in the region of the plug connector.

Swelling is especially understood to mean a chemical reaction, adsorption, preferably an absorption, or combinations thereof between the first material and the fluid, in which an increase in volume of the first material is brought about. According to the invention, the increase in volume acts as an increase in the sealing pressure in the region of the plug connector. This results in sealing of capillary gaps between the housing shell and the plug connector without additional sealants, which simplifies the production of the electronics housing, and this has a beneficial effect on the production costs.

The pump is preferably an auxiliary or additional pump in the form of an electric motor for a motor vehicle, especially an oil pump for lubrication of transmission parts of a motor vehicle transmission. The fluid required here is appropriately oil, for example automatic transmission fluid (ATF) oil, and also serves, for example, to cool the components or additional components of a drive train of a motor vehicle of this kind. The term "oil" is understood here, more particularly, not to be restricted to mineral oils. Instead, it is also possible to use fully synthetic or partly synthetic oil, silicone oil or other oily fluids, for example a hydraulic fluid or a cooling lubricant, in which case a corresponding swelling material in each case is used for the plug connector.

The pump electronics preferably include an electronic circuit or control unit for control and regulation of a signal-coupled electric motor of the pump and sensors for detection of engine signals. For the purpose of coupling for signaling and/or flow purposes, the pump electronics are coupled in an electrically conductive manner by one or more plug connectors to an electric motor of the pump, actuators and/or a motor vehicle cable harness. It is conceivable here, for example, that a plug connector is designed with multiple conductor tracks for the various electronic components, or multiple plug connectors are provided on the housing shell, in which case each plug connector is preferably at least partly ensheathed by the swelling material.

In a suitable development, swelling of the first material seals the housing shell in a fluid-tight manner in the region of the plug connector. The swelling of the first material thus ensures that no oil gets into the pump electronics. More particularly, only the material swells in direct contact with the oil, such that, for example, capillary gaps are sealed automatically. This means that the electronics housing is set up, in a simple construction, to avoid leaks in the event of high temperature variations in the operation of the oil pump and the associated housing expansions, i.e. different expansions of the housing shell and/or the plug connector with increasing temperatures and hence falling viscosity of the oil used.

For the purpose of simple and inexpensive production, in a suitable configuration, the housing shell is an injection molding. Preferably, for this purpose, a thermoplastic material is used, which is chemically inert with respect to contact with the oil, preferably a polyamide (PA), polybutylene terephthalate (PBT) or polyphenylene sulfide (PPS) material. This provides a mechanically stable housing for the pump electronics.

In a suitable development, the plug connector is a lead frame over molded with the first material, as a result of which, more particularly, an insert is formed, which, in a preferred execution, is at least partly over molded in the housing shell. An insert is especially understood to mean a component which is inserted in a fixed manner into an injection mold and is fully or at least partly over molded by a second component. The insert and the housing shell as second component thus form a compact and mechanically stable unit.

More particularly, this enables simple and inexpensive production of the electronics housing in the manner of a two-component process, wherein, in a suitable configuration, in terms of the method, a plug connector is at least partly over molded with the swelling first material and the insert formed thereby is then over molded with a second material of the housing shell.

In a preferred configuration, the plug connector is over molded from the outside in a form-fitting manner with the second material of the housing shell. In a suitable configuration, the lead frame for the insert has a number of blade contacts as electrical plug connection within the housing shell. These blade contacts have at least partly been over molded by the first material, and have additionally been over molded with the second material from the outside in the region of the over molding within the housing shell. The second material thus ensheaths or surrounds the over molding by the first material in an essentially form-fitting manner, such that, in the event of swelling of the increase in material volume proceeds only in the direction of the blade contacts or capillary gaps. The additional non-swelling sheath results in an additional increase in the sealing pressure through the increase in volume, such that the housing shell is particularly fluid-tight. Moreover, uncontrolled swelling of the material in the direction of the pump electronics is prevented.

In an advantageous development, the first material is an elastic polymer material or elastomer. As a result, it is possible in a simple manner to balance out the temperature variations in the operation of the oil pump, or the housing expansions that occur as a result, i.e. different expansions of the housing shell and/or the plug connector at increasing temperatures. This advantageously reduces or avoids mechanical stresses on the electronics housing.

In a preferred execution, the elastomer is especially a styrene and butadiene copolymer which swells on contact with the preferably mineral oil. In a typical embodiment, the elastomer is suitably a styrene-butadiene rubber (SBR), which means that production is particularly inexpensive.

In the preferred application, the electronics housing serves to accommodate and encapsulate pump electronics of an electric motor pump for conveying a fluid, especially an auxiliary pump in the form of an electric motor in a motor vehicle. The fluid is preferably mineral lubricant oil for at least temporary lubrication of transmission components of a motor vehicle transmission, especially an automatic transmission.

The advantages achieved by the invention are especially that the contact site of a plug connector in the electronics housing that has a tendency to leak is executed in a self-sealing manner. The execution of the plug connector as an insert in the housing shell over molded with a swelling material, in a manner which is particularly simple in construction terms and inexpensive, counteracts penetration of the fluid into the interior of the housing. The swelling reliably and automatically seals the region between the insert and the housing shell and the capillary gaps between the insert overmolding and the over molded conductor tracks of the plug connector that occur in operation of the pump.

In this case, preferably two different materials are provided for the housing shell and the over molding of the plug connector. The housing shell is preferably manufactured from a mechanically stable thermoplastic or thermoset, such that the pump electronics arranged therein are protected in an operationally reliable manner. Only the over molding of the plug connector is manufactured from a swelling plastic, and additional ensheathing by the thermoplastic ensures that the plastic preferably swells merely locally in a defined volume. This generates a particularly high sealing pressure when the volume increases, as a result of which the housing shell is sealed hermetically and in a fluid-tight manner.

A possible material combination for use in an oil pump comprises, for example, a PA, PBT or PPS polymer for the housing shell with an SBR or silicone rubber as swelling over mold for the insert.

However, the invention is not limited to the above-described application in an oil pump. Instead, through a suitable choice of material, it is also possible to execute electronics housings such that they are self-sealing with respect to other fluids. For example, for a water pump in the form of an electric motor for a motor vehicle windshield wiper, it is conceivable that the housing part is manufactured from a PPS polymer and the plug connector is over molded with a water-swelling PA polymer.

Other features which are considered as characteristic for the invention are set forth in the appended claims.

Although the invention is illustrated and described herein as embodied in an electronic housing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

Corresponding components are always given the same reference numeral in all figures.

DETAILED DESCRIPTION OF THE INVENTION

Figure 1:
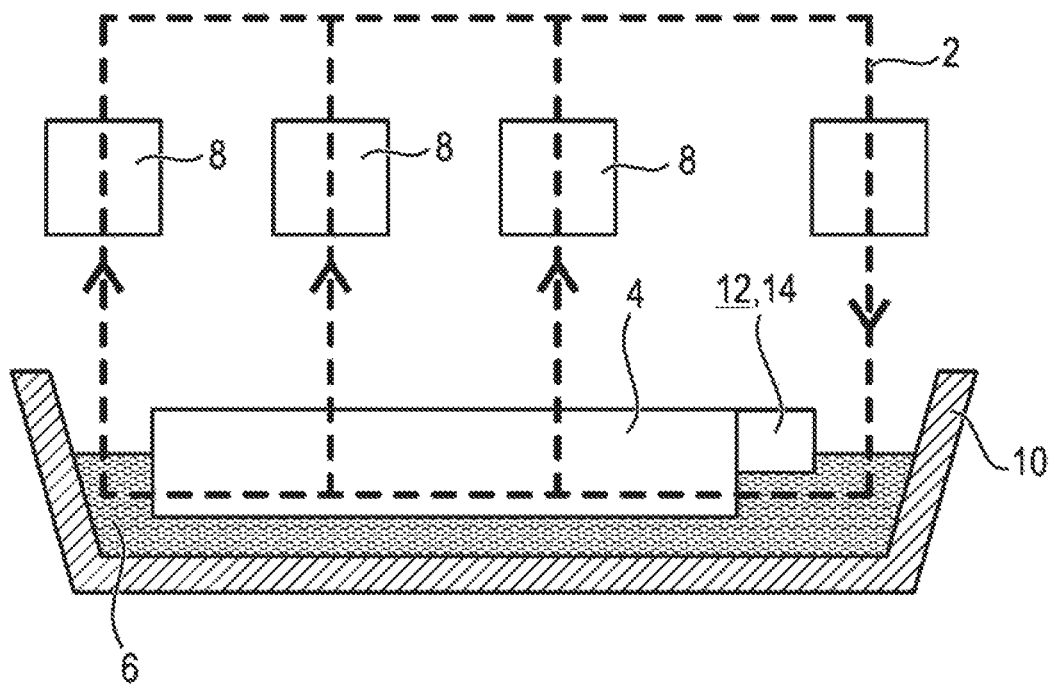
FIG. 1 is a schematic diagram of an oil circuit of a motor vehicle, the oil circuit containing an oil sump, an oil pump, especially an auxiliary or additional pump operated or driven by electric motor for a motor vehicle transmission, containing three transmission components and containing an electronics housing for accommodating and encapsulating pump electronics.

Referring now to the figures of the drawings in detail and first, particularly to FIG. 1 thereof, there is shown a schematic of an oil circuit 2 of a motor vehicle. The oil circuit 2 has an electric motor pump or oil pump 4 for conveying a fluid 6, especially a mineral (lubricant) oil, as lubricant for transmission components 8, especially moving transmission components, of a motor vehicle transmission. The transmission components 8 are moving parts or components of a motor-vehicle transmission, for example bearings or actuators. The oil circuit 2 also has an oil sump 10 to accommodate excess oil 6.

For regulation and actuation of an electric motor of the oil pump 4, which is not shown in detail, pump electronics 12 are coupled to the oil pump 4 for signaling purposes. The pump electronics 12 are arranged in a fluid-tight electronic housing 14 for protection from the oil 6.

Figure 2:
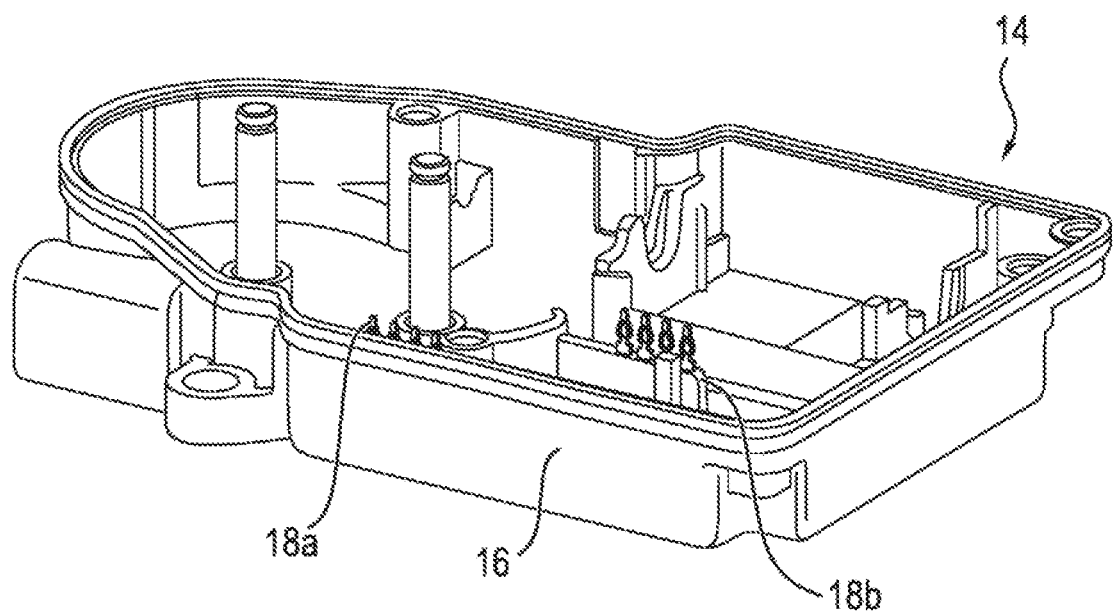
FIG. 2 is a diagrammatic, perspective view of an electronics housing having a housing shell and a number of plug connectors.

As apparent in FIG. 2, the electronics housing 14 has a housing shell 16 and two electrical plug connectors 18a and 18b, which at least partly project through the housing shell. The pump electronics 12 further include an electronic circuit, not shown in detail, which is coupled in an electrically conductive manner by the plug connectors 18a and 18b firstly to the electric motor and secondly to a motor vehicle cable harness. The motor current provided via the motor vehicle cable harness is commutated by the electronic circuit, such that it is suitable for the operation of the preferably brushless electric motor.

Figure 3:
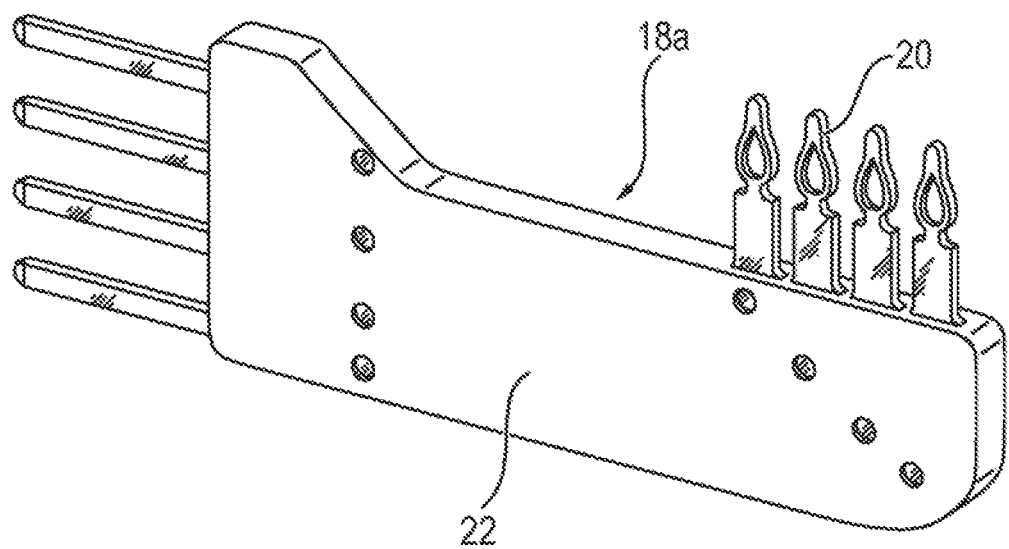
FIG. 3 is a perspective diagram of a first plug connector.
Figure 4:
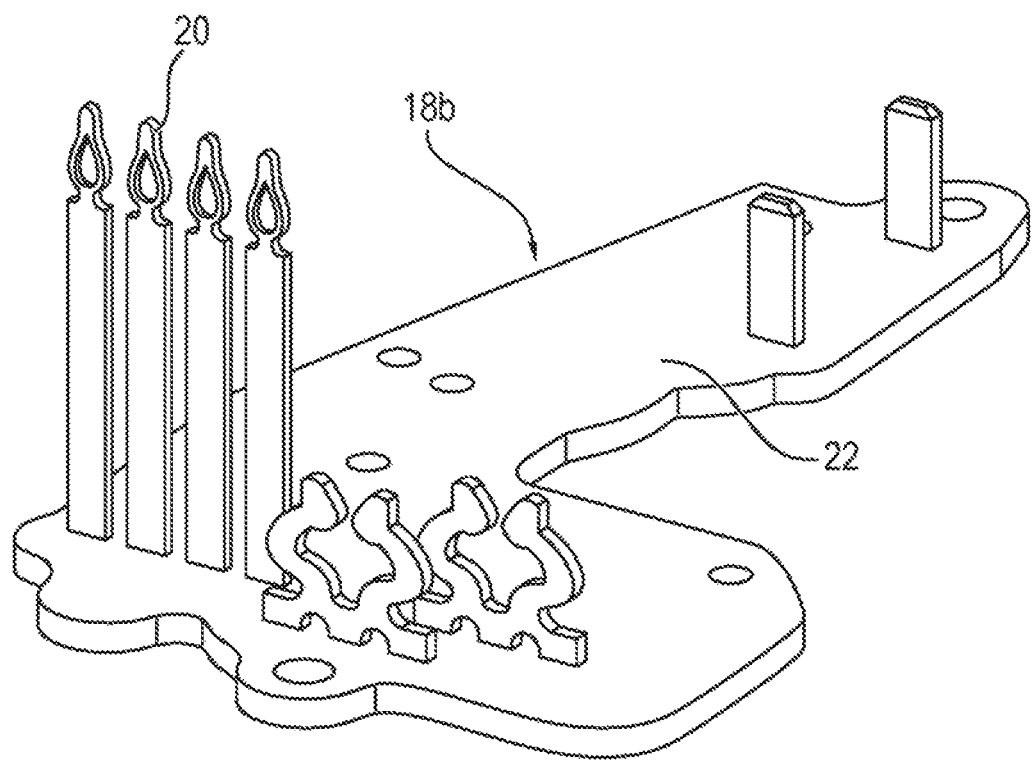
FIG. 4 is a perspective diagram of a second plug connector.

The plug connectors 18a and 18b are essentially lead frames having a number of conductor tracks 20 executed as blade contacts as electrical plug connection elements, of which only one in each case is given a reference numeral by way of example. The plug connectors 18a and 18b—as comparatively clearly apparent in FIG. 3 and FIG. 4—are executed as preliminary injection moldings or inserts. For this purpose, the conductor tracks 20 are at least partly ensheathed by an over mold 22 in the course of a first injection molding process. The over mold 22 in this execution is a styrene and butadiene copolymer, especially an elastic styrene-butadiene rubber, which swells, i.e. increases in volume, on contact with the oil 6.

The housing shell 16 is over molded around the plug connectors 18a and 18b in a second injection molding process. The housing shell 16 is preferably manufactured from a thermoplastic, especially a polyamide polymer. In this case—as apparent in FIG. 2—the over molds 22 of the plug connectors 18a and 18b within the housing shell 16 have once again been over molded with the housing shell plastic from the outside. As a result, the conductor tracks 20 are surrounded in an essentially form-fitting manner by the housing shell 16.

As indicated in FIG. 1, a typical installation, the electronics housing 14 together with the oil pump 4 are arranged in the oil sump 10. In this case, the electronics housing 14 lies fully or at least partly directly in the oil 6. The motor vehicle transmission and hence the oil pump 4 and the electronics housing 14, in operation, are suitable and set up for a temperature range from −40° C. to +130° C.

Especially when operating temperatures are relatively high or when temperatures are rising for operational reasons, housing expansions sometimes occur, i.e. different expansions of the electronics housing 14 and/or the plug connectors 18a, 18b. As a result, especially in the region of the over molded lead frames, capillary gaps frequently occur between the over mold 22 and the conductor tracks 20, into which the oil 6 can flow from oil sump 10.

If oil 6 flows into a gap of this kind, it comes into direct contact with the styrene-butadiene rubber in the over molds 22, which then starts to swell. The resulting increase in volume is limited by the form-fittingly over molded housing shell 16, which results in an increase in the sealing pressure, especially in the region of the capillary gaps. As a result, the gaps are automatically sealed by the oil 6 from the electronics housing 14, such that the encapsulated pump electronics 12 are accommodated in a fluid-tight manner.

The invention is not limited to the above-described working examples. Instead, it is also possible for the person skilled in the art to infer other variants of the invention therefrom, without leaving the subject matter of the invention. More particularly, moreover, all the individual features described in connection with the working examples can also be combined with one another in other ways without leaving the subject matter of the invention.

For example, it is also possible to use other materials for the production of the electronics housing 14. What is essential is that the plug connectors 18 are executed as inserts with a swelling over mold 22 that has an increase in volume on contact with the oil. The additional form-fitting over mold by means of the housing shell 16 ensures that the increase in volume counteracts further penetration of the oil 6, and hence provides a fluid-tight seal in the contact region with the oil 6. As a result, the electronics housing 14 is protected in a self-sealing manner against penetrating oil 6.

The following is a summary list of reference numerals and the corresponding structure used in the above description of the invention:
2 oil circuit
4 oil pump/pump
6 fluid/oil
8 transmission components
10 oil sump
12 pump electronics
14 electronics housing
16 housing shell
18*a*, 18*b* plug connectors
20 conductor tracks
22 over mold

The invention claimed is:

1. An electronics housing for pump electronics of an electric motor pump for a motor vehicle, the electric motor pump conveying a fluid, the electronics housing comprising:
   an injection molded housing shell; and
   an electrical plug connector projecting at least partly through said housing shell, said electrical plug connector being at least partly ensheathed with a first material that swells on contact with the fluid resulting in an increase in volume of the first material, said electrical plug connector being a lead frame overmolded with said first material, and swelling of the first material seals said housing shell in a fluid-tight manner in a region of said electrical plug connector;
   said electrical plug connector being an insert overmolded from an outside in a form-fitting manner with a second material of said housing shell.

2. The electronics housing according to claim 1, wherein said first material is an elastic polymer material.

3. The electronics housing according to claim 2, wherein said first material is a styrene and butadiene copolymer.

4. An electric motor pump for conveying a fluid, comprising:
   pump electronics;
   an electronics housing housing said pump electronics, said electronics housing having an injection molded housing shell and an electrical plug connector projecting at least partly through said housing shell, said electrical plug connector being at least partly ensheathed with a first material that swells on contact with the fluid resulting in an increase in volume of the first material, said electrical plug connector being a lead frame overmolded with said first material, and swelling of the first material seals said housing shell in a fluid-tight manner in a region of said electrical plug connector;
   said electrical plug connector being an insert overmolded from an outside in a form-fitting manner with a second material of said housing shell.

5. A method of producing an electronics housing for pump electronics of an electric motor pump for a motor vehicle, the electric motor pump conveying a fluid, which comprises the steps of:
   providing an electrical plug connector being a lead frame;
   overmolding the plug connector with a first material that swells on contact with a fluid resulting in an increase in volume of the first material, the first material at least partly ensheathing the plug connector; and
   overmolding from an outside over the first material and the plug connector in a form-fitting manner with a second material of a housing shell, the plug connector projecting at least partly through the housing shell and, on contact with the fluid, a swelling of the first material sealing the housing shell in a fluid-tight manner in a region of the electrical plug connector.

6. The method according to claim 5, which further comprises disposing pump electronics of an electric motor pump for a motor vehicle in the electronics housing, the electric motor pump conveying the fluid.

* * * * *